No. 873,965. PATENTED DEC. 17, 1907.
H. B. SMITH.
POWER TRANSMITTING MECHANISM.
APPLICATION FILED NOV. 3, 1906.

2 SHEETS—SHEET 1.

Witnesses:
Inventor:

No. 873,965.  
PATENTED DEC. 17, 1907.  
H. B. SMITH.  
POWER TRANSMITTING MECHANISM.  
APPLICATION FILED NOV. 3, 1906.

2 SHEETS—SHEET 2.

Witnesses:

Inventor:
Hollis B. Smith
by his attorney

UNITED STATES PATENT OFFICE.

HOLLIS B. SMITH, OF CAMBRIDGE, MASSACHUSETTS.

POWER-TRANSMITTING MECHANISM.

No. 873,965.  Specification of Letters Patent.  Patented Dec. 17, 1907.

Application filed November 3, 1906. Serial No. 341,819.

*To all whom it may concern:*

Be it known that I, HOLLIS B. SMITH, a citizen of the United States, residing at Cambridge, in the county of Middlesex and State of Massachusetts, have invented new and useful Improvements in Power-Transmitting Mechanism, of which the following is a specification.

This invention relates to improvements in power transmitting mechanisms known as single belt reversible countershafts, and the objects are first, to reduce the amount of shock due to reversal and thereby lessen the wear and liability of breakage. Second, to make easy the fitting of the several parts of the mechanism to the shaft, when said mechanism is substituted for an ordinary two-belt countershaft mechanism, and third, to provide a mechanism of the character described which shall be compact especially as regards its length.

The invention consists in the combination and arrangement of parts set forth in the following specification and particularly pointed out in the claims thereof.

Figure 1:
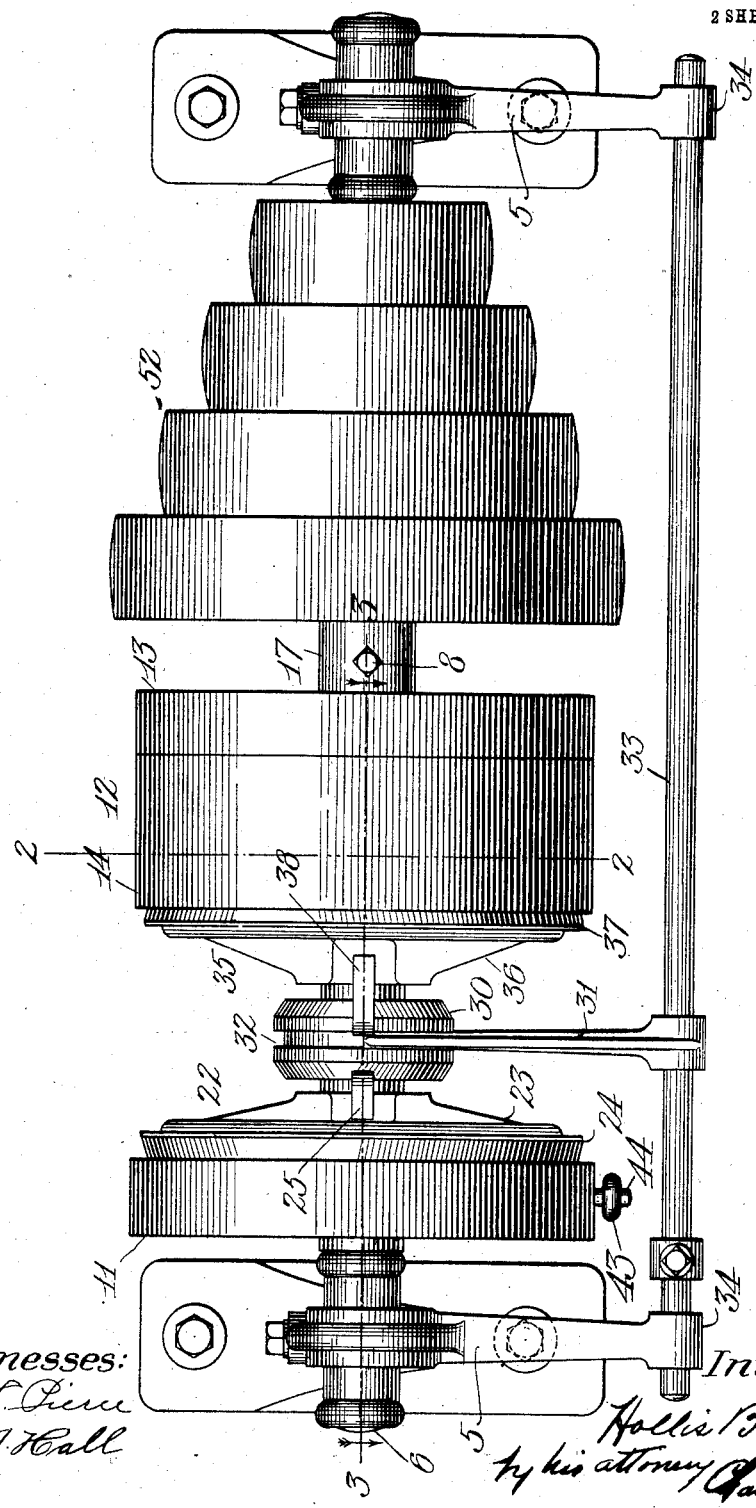
Figure 2:
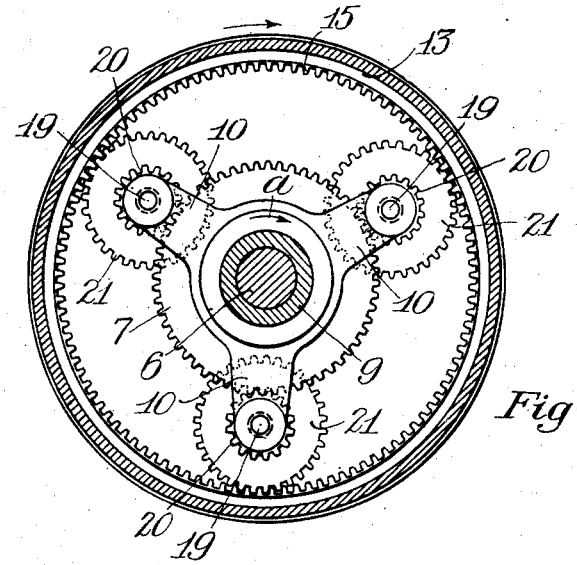
Figure 3:
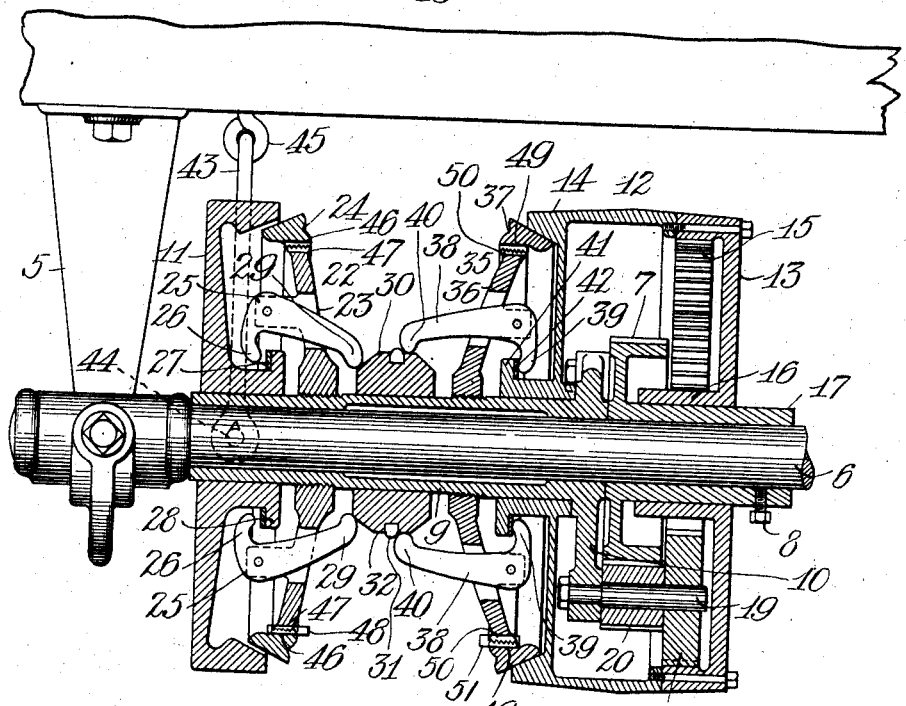

Referring to the drawings: Figure 1 is an underneath plan view of my improved power transmitting mechanism as it is viewed when placed upon a ceiling. Fig. 2 is a section partly in elevation on line 2—2 of Fig. 1 looking toward the right. Fig. 3 is a section, partly in elevation, taken on line 3—3 of Fig. 1, looking in the direction of the arrows.

Like numerals refer to like parts throughout the several views of the drawings.

In the drawings, 5, 5 are hangers provided with suitable bearings in which a shaft 6 is journaled. An external gear 7 is mounted on the shaft 6 and secured thereto by means of a set screw 8. A rotatable member or sleeve 9 provided with a plurality of arms 10, 10, 10 is journaled on the shaft 6. A stationary clutch member 11 is mounted on the sleeve 9, said sleeve being adapted to rotate within said clutch member. The clutch member 11 is stationary as regards rotary movement, but is free to move longitudinally of the sleeve 9. An internal gear member 12 constituting also a pulley and a rotary clutch member is preferably made up of two parts 13 and 14, 13 being an internal gear provided with teeth 15 formed therein and having a hub 16 journaled on the hub 17 of the external gear 7.
14 is a female clutch member having a hub journaled on the sleeve 9.

It will be understood that the internal gear member 12 is adapted to be driven constantly by a belt from a main driving shaft.

A plurality of studs 19, 19, 19 are fast to the arms 10, 10, 10, respectively. A series of pinions 20, 20, 20 are journaled on the studs 19, respectively, and are fast to the pinions 21, respectively. The pinions 21 mesh into the internal gear 13. A male clutch member 22 comprising a central portion 23 and a ring 24 having screw-threaded engagement therewith is adapted to engage the stationary clutch member 11. Two dogs 25, 25 are pivotally mounted on the central portion 23 of the clutch member 22. Said dogs 25 are provided with fingers 26, respectively, said fingers being adapted to engage a washer 27 which intervenes between said fingers and a flange 28 formed on the clutch member 11. The dogs 25 are also provided with fingers 29, 29, respectively, adapted to engage a spool 30, said spool being slidably mounted on the sleeve 9.

A shipper 31 having engagement with an annular groove 32 formed in the spool 30 is adapted to move said spool longitudinally of the sleeve 9. The shipper 31 is fast to a shipper rod 33, said shipper rod being slidably mounted in bearings 34, 34 formed on the hangers 5, 5, respectively. When the spool 30 is moved toward the left, Figs. 1 and 3, the stationary clutch member 11 is thrown into engagement with the male clutch member 22, thus holding the sleeve 9 stationary. A second male clutch member 35 comprising a central portion 36 and a ring 37 having screw-threaded engagement therewith is fast to the sleeve 9 and is adapted to engage the female clutch member 14. Two dogs 38, 38, pivotally mounted on the central portion 36 of the clutch member 35 are provided with fingers 39, 39, respectively, and also with fingers 40, 40, respectively.

The female clutch member 14 is provided with a flange 41 formed thereon. A washer 42 intervenes between the fingers 39 and said flange 41. When the spool 30 is moved toward the right, Figs. 1 and 3, the female clutch member 14 is thrown into engagement with the male clutch member 35, thereby causing the sleeve 9 to rotate with said female clutch member 14. A resilient connection 43 is fast at one end to a pin 44, said pin being fast to the stationary clutch member 11. Said resilient connection is fast at its other end to an eye-bolt 45, said eye-bolt being secured to the ceiling. The ring 24 is provided with a plurality of grooves 46 while the central portion 23 of the clutch member 22 is provided with one or more grooves 47. When it is desired to adjust the ring 24 with relation to the central portion 23 of the clutch member 22, said ring may be rotated thereon by reason of the screw-thread by which it is attached thereto and when adjusted in its proper position may be locked thereto by a pin 48 adapted to engage one of the grooves 46 and one of the grooves 47, said pin thereby preventing relative rotation between the ring 24 and the central portion 23. The ring 37 is provided with grooves 49 and the central portion 36 is provided with one or more grooves 50. The ring 37 may be adjusted in a manner similar to that hereinbefore described in connection with the ring 24 and when adjusted is held in its proper relation with the central portion 36 by means of a pin 51.

The operation of the mechanism hereinbefore specifically described is as follows: Assuming that the internal gear member is being rotated constantly in one direction and the spool 30 being located in mid-position so that both clutches are out of engagement, the internal gear 13 imparts a rotary movement to the pinions 21, and, therefore, to the pinions 20 fast to said pinions 21, respectively. The friction of the shaft 6 in its bearings and also the friction of a machine not shown to which a cone pulley 52 fast to said shaft and belted to said machine is sufficient to hold said shaft 6 and the external gear 7 fast thereto stationary. Therefore, as the internal gear 13 is rotated the pinions 20 will be caused to revolve about the external gear 7 and the sleeve 9 will be rotated in the same direction as the internal gear 13, but at a slower speed.

The ratio of the internal gear to the pinions 21, the ratio of the pinions 21 to the pinions 20, and the ratio of the pinions 20 to the external gear 7 is such that at this time the sleeve 9 rotates in the same direction as the internal gear 13, and rotates at a slower speed than said internal gear. When it is desired to cause the shaft 6 to be rotated in the direction of the arrow a, Fig. 2, the spool 30 is moved toward the right to the position shown in Figs. 1 and 3, thereby bringing the clutch members 14 and 35 into engagement with each other. The clutch member 35 being fast to the sleeve 9, said sleeve is thereby rotated in unison with the internal gear 13. There being at this time no relative movement between the sleeve 9 and the internal gear 13 it is, therefore, impossible for the pinions 20 and 21 to rotate on their studs 19. The external gear 7 is, therefore, by reason of its meshing with the pinions 20, locked to the internal gear 13, and said internal gear 13, the pinions 20 and 21, the sleeve 9, and the external gear 7 are then rotated as one piece. In this way what is known as a direct drive is obtained. When it is desired to impart a reverse movement to the shaft 6, the spool 30 is moved toward the left thus withdrawing the clutch member 35 from engagement with the clutch member 14 and throwing the clutch member 22 into engagement with the clutch member 11. The clutch member 11 being stationary instantly stops the sleeve 9. The resilient connection 43 absorbs the shock caused by this sudden stopping of the sleeve 9. At this time the sleeve 9 being held stationary and the internal gear 13 being rotated relatively thereto, the pinions 21 are together with the pinions 20 rotated on their studs, thereby causing said pinions 20 to impart to the external gear 7 a rotary motion in a direction opposite to the direction of rotation of the internal gear 13.

While in the specific embodiment of my invention herein shown, I have shown the intermediate gearing compounded it will be evident that if desired, the pinions 20, 20, 20 may be dispensed with and the pinions 21, 21, 21 may be made of suitable size to mesh into both the internal gear 13 and the external gear 7. It will also be evident that the ratio of the gearing may be changed to suit various conditions.

When on the reverse, that is, when the clutch member 22 is in engagement with the clutch member 11, the clutch member 35 is, of course, motionless and when thrown into engagement with the clutch member 14, the shock due to starting the motionless parts, is far less than in other mechanisms of like character in which when on the reverse, the forward drive member is rotating in a direction opposite to that of its corresponding member carried by the pulley and has to be stopped and then started up again in the direction of the pulley.

Having thus described my invention, what I claim and desire by Letters Patent to secure is:

1. In a power transmitting mechanism, a shaft, a rotatable member journaled on said shaft, an external gear mounted on said shaft, an internal gear, two pinions of different diameters fast to each other and rotatably mounted on said member, the smaller of said pinions meshing into said external gear and the larger of said pinions meshing into said internal gear, a stationary member, and means for connecting said rotatable member to said stationary member and to said internal gear one at a time.

2. In a power transmitting mechanism, a shaft, a sleeve rotatably mounted on said shaft, an external gear mounted on said shaft, said gear provided with a hub, an internal gear member journaled on said sleeve and hub, two pinions of different diameters fast to each other and rotatably mounted on said sleeve, the smaller of said pinions meshing into said external gear and the larger of said pinions meshing into said internal gear, a stationary member, and means for connecting said sleeve to said stationary member and to said internal gear one at a time.

3. In a power transmitting mechanism, a shaft, a sleeve rotatably mounted on said shaft, an external gear fast to said shaft, said gear provided with a hub, an internal gear, constituting also a rotary clutch member, journaled on said sleeve and hub, two pinions of different diameters fast to each other and rotatably mounted on said sleeve, the smaller of said pinions meshing into said external gear and the larger of said pinions meshing into said internal gear, a stationary clutch member, two clutch members fast to said sleeve adapted to engage said rotary clutch member and said stationary clutch member, respectively, and means to operate said clutch members.

4. In a power transmitting mechanism, a shaft, a sleeve rotatably mounted on said shaft, a series of pinions rotatably mounted on said sleeve, a second series of relatively larger pinions fast to said first named series, respectively, an external gear mounted on said shaft, a stationary member, an internal gear member, and means for connecting said rotatable sleeve to said stationary member and to said internal gear member one at a time.

5. In a power transmitting mechanism, a shaft, a sleeve rotatably mounted on said shaft, said sleeve provided with a plurality of radial arms, a plurality of studs fast to said arms, respectively, an external gear fast to said shaft, said gear provided with a hub, an internal gear member journaled on said sleeve and hub, a plurality of pinions journaled on said studs, respectively, said pinions adapted to transmit motion from said internal gear to said external gear, a stationary member, and means for connecting said rotatable sleeve to said stationary member and to said internal gear one at a time.

6. In a power transmitting mechanism, a shaft, a sleeve rotatably mounted on said shaft, an external gear mounted on said shaft, said gear provided with a hub, an internal gear member, constituting also a rotary clutch member, journaled on said sleeve and hub, a series of pinions rotatably mounted on said sleeve, said pinions meshing into said external gear, a series of relatively larger pinions fast to said first named pinions, said last named pinions meshing into said internal gear, a stationary clutch member, two clutch members fast to said sleeve adapted to engage said rotary clutch member and said stationary clutch member, respectively, and means to operate said clutch members.

7. In a power transmitting mechanism, a rigid support, a shaft, a rotatable member journaled on said shaft, an external gear mounted on said shaft, an internal gear, intermediate gears rotatably mounted on said rotatable member, said intermediate gears adapted to transmit motion from said internal gear to said external gear, a stationary member, a yielding connection fast to said rigid support and to said stationary member, and means for connecting said rotatable member to said stationary member and to said internal gear one at a time.

In testimony whereof I have hereunto set my hand in presence of two subscribing witnesses.

HOLLIS B. SMITH.

Witnesses:
 LOUIS A. JONES,
 SADIE V. MCCARTHY.